United States Patent [19]

Fung et al.

[11] Patent Number: 4,595,669

[45] Date of Patent: Jun. 17, 1986

[54] METHOD OF PREPARING AN IMPROVED CATALYST

[75] Inventors: Shun C. Fung, Bridgewater; Samuel J. Tauster, Englishtown, both of N.J.

[73] Assignee: Exxon Research and Engineering Co., Florham Park, N.J.

[21] Appl. No.: 550,902

[22] Filed: Nov. 10, 1983

[51] Int. Cl.$^4$ ............................................. B01J 29/30
[52] U.S. Cl. ........................................ 502/74; 502/66
[58] Field of Search ................................... 502/74, 66

[56] References Cited

U.S. PATENT DOCUMENTS

| | | | |
|---|---|---|---|
| 3,216,789 | 11/1965 | Breck et al. | 23/113 |
| 3,318,802 | 5/1967 | Martin | 502/74 X |
| 3,534,087 | 10/1970 | Leftin et al. | 502/74 X |
| 3,644,220 | 2/1972 | Kearby | 502/74 X |
| 4,104,320 | 8/1978 | Bernard et al. | 260/673.5 |

FOREIGN PATENT DOCUMENTS

| | | |
|---|---|---|
| 0040119 | 11/1981 | European Pat. Off. |
| 0096479 | 12/1983 | European Pat. Off. |
| 2114150 | 8/1983 | United Kingdom. |
| 2116450 | 9/1983 | United Kingdom. |

OTHER PUBLICATIONS

Translation–French Patent 2,360,540 issued 4/7/78.
Flynn et al., J. Catal., 33, pp. 233–248 (1974).

*Primary Examiner*—Carl F. Dees
*Attorney, Agent, or Firm*—J. Simon; E. Thomas Wheelock

[57] ABSTRACT

A reforming catalyst comprising a type L zeolite containing at least one Group VIII noble metal may be prepared by a method involving contacting the freshly prepared catalyst with oxygen, hydrogen or an inert gas and optionally water at elevated temperatures, contacting the catalyst at elevated temperatures with a source of chlorine such as HCl or $Cl_2$ and preferably oxygen and water, and contacting the catalyst at elevated temperatures with oxygen and optionally water. Prior to use the catalyst is reduced by contact at elevated temperatures with hydrogen and optionally water. This process enhances the dispersion of the noble metal particles.

27 Claims, 6 Drawing Figures

500Å

METHOD OF PREPARING AN IMPROVED CATALYST

BACKGROUND OF THE INVENTION

1. Field of the Invention

This invention relates to a method of preparing reforming catalysts of enhanced dispersion consisting of one or more Group VIII noble metals supported on zeolites, preferably a catalyst consisting of platinum on potassium-containing zeolite L. The catalyst herein exhibits improved activity and activity maintenance for light naphtha aromatization over catalysts of lesser dispersion.

2. Discussion of the Relevant References

Several materials have been employed as hydrocarbon conversion catalysts in such processes as reforming, catalytic dewaxing, alkylation, oxidation and hydrocracking. Examples of catalysts useful for this purpose include those materials comprising catalytically active metal such as a Group VIII noble metal and optionally rhenium supported on or impregnated into a carrier.

Among the hydrocarbon conversion processes, catalytic reforming in the presence of hydrogen is one of the most important. Catalytic reforming is a refinery process designed to increase the octane number of naphtha. Typically in this process, the naphtha is passed over a suitable catalyst under reforming conditions, for example elevated temperatures and pressures well known in the industry in the presence of hydrogen gas and a $H_2$/hydrocarbon mole ratio of about 2 to 20. This process involves several different types of reactions, including isomerization, dehydrocyclization of paraffins to produce naphthenes and aromatics, dehydrogenation of cyclohexanes and other naphthenes and alkanes, isomerization/dehydrogenation of cyclopentanes, isomerization of normal paraffins to isoparaffins, and hydrocracking. Paraffin isomerization occurs relatively easily, but contributes only a limited improvement in octane number The reforming reactions most important for the production of high octane components are those which produce aromatics.

The ideal reaction scheme minimizes the hydrocracking of long chain paraffins to gaseous hydrocarbons such as methane and ethane to improve the yield and selectivity to more valuable products of the other reforming reactions, particularly dehydrocyclization. Examples of known catalysts useful for reforming include platinum and optionally rhenium or iridium on an alumina support, platinum on type X and Y zeolites, provided the reactants and products are sufficiently small to flow through the pores of the zeolites, and platinum on cation exchanged type L zeolites.

While zeolite L catalysts, usually in their hydrogen form, have been employed as catalytic dewaxing catalysts and in other applications, they are particularly useful in reforming because they decrease the amount of hydrocracking which occurs during reforming. For example, U.S. Pat. No. 4,104,320 discloses that the use of zeolite L as a support increases the selectivity of the reaction for producing aromatic products. This improvement, however, has been made at the expense of catalyst life. U.K. Appln. 82-14147 filed May 14, 1982 to Wortel entitled "Improved Zeolite L" teaches that a highly crystalline zeolite L material having a cylindrical morphology leads to an improved catalyst life for dehydrocyclization reactions over a conventionally prepared zeolite L disclosed in U.S. Pat. No. 3,216 789.

Finally, Belg. Pat. Nos. 895,778 and 895,779 disclose use of a barium-exchanged zeolite L catalyst for high yields in reforming, dehydrocyclization, dealkylation and dehydroisomerization.

It is well known that coke deposits may be removed from deactivated catalysts by heating them in the presence of dilute oxygen at a flame-front temperature of 430° to 540° C. This combustion may be preceded by a flushing with hydrogen or nitrogen gas. High temperature decoking leads, however, to loss of surface area of the supported metal particles and to removal of platinum from the zeolite channels, thus resulting in loss of catalyst activity. Thus, after combustion, the catalyst is often subjected to oxychlorination by contact with air and chlorine or a chlorinated compound such as $CCl_4$ at elevated temperatures. U.K. Patent application G.B. 2,106,413A, priority document, filed in France, on Sept. 9, 1981 to Bernard et al. further teaches that catalyst regeneration is improved by subjecting the catalyst after oxychlorination to a treatment with water and cooling air before the catalyst is reduced, In addition, French. Appl. No. 8000114 to Bernard discloses a hydrogen regeneration technique. These techniques, however, have not been applied to freshly prepared catalysts which are defined for purposes herein as catalysts which have not been contacted with a hydrocarbon feed.

SUMMARY OF THE INVENTION

In accordance with the present invention it has now been found that reforming catalysts may be effectively prepared which have enhanced catalyst activity and activity maintenance by a process whereby a catalyst based on a type L zeolite is prepared and the dispersion of the noble metal(s) therein is enhanced by an oxychlorination procedure. The procedure leads temporairly to excess chlorine on the catalyst surface. The excess chlorine is then removed from the catalyst preferably by contacting the catalyst with a gas stream comprising preferably wet oxygen.

More preferably, the method herein for preparing the reforming catalysts comprises the steps of:

(a) heating a freshly prepared catalyst comprising a type L zeolite containing at least one Group VIII noble metal at a temperature of from about 380° to 540° C. for up to 10 hours in the presence of an atmosphere comprising oxygen; hydrogen or an inert gas, preferably hydrogen, and from 0 to 10% by volume water;

(b) this step can proceed in one of four manners:

(i) The catalyst is oxychlorinated (dispersion of the noble metal) by heating the catalyst at a temperature of from about 400° to 530° C. for up to 10 hours in the presence of a gaseous stream comprising from 0 to 10% by volume water and a source of chlorine in the presence of oxygen.

(ii) The catalyst is chlorinated by heating the catalyst at a temperature of from about for 400° up to 530° C. for up to 10 hours in the presence of gaseous stream comprising from 0 to 10% by volume water and a source of chlorine in the presence of hydrogen, but when HCl is the source of chlorine, hydrogen is not required. Oxychlorination will then occur in subsequent step (c).

(iii) Combining steps (ii) and (i) in that order. The preferred chlorine sources in these steps are HCl and Cl$_2$.

(iv) The catalyst is chlorinated by heating at a temperature from about 400° to 530° C. for up to 10 hours in the presence of a gaseous stream comprising from 0 to 10% by volume of water and an effective amount of chlorine.

(c) heating the catalyst at a temperature of from about 400° to 540° C. for up to 7 hours in the presence of a gaseous stream comprising oxygen and in the substantial absence of water, or for up to 5 hours in the presence of a gaseous stream comprising oxygen and from greater than 0 to 10% by volume water; and (d) heating the catalyst at a temperature of from about 400° to 530° C. for up to 10 hours in the presence of a gaseous stream comprising from 0 to 10% by volume water and a source of hydrogen.

The preferred catalysts prepared by the process herein consist of a type L zeolite having exchangeable cations of which at least 75 percent are selected from Li, Na, K, Rb, Cs, Ca and Ba cations which contain at least one Group VIII noble metal and are characterized in that the particles of the noble metal, prior to reduction, are well dispersed over the surface of the catalyst and at least about 90% of the noble metal prior to reduction, is dispersed in the form of particles having a diameter of less than about 7 Å. More preferably the catalyst will be such that more than 98% of the noble metal, prior to or after reduction, but preferably after reduction, is dispersed in the form of particles having a diameter less than about 7 Å and less than 2% is dispersed in the form of particles measured to a diameter of 7 Å or greater.

The method herein results in catalysts which have effective catalyst activity and activity maintenance for a sustained period of reforming.

DESCRIPTION OF THE PREFERRED EMBODIMENTS

Figure 1:
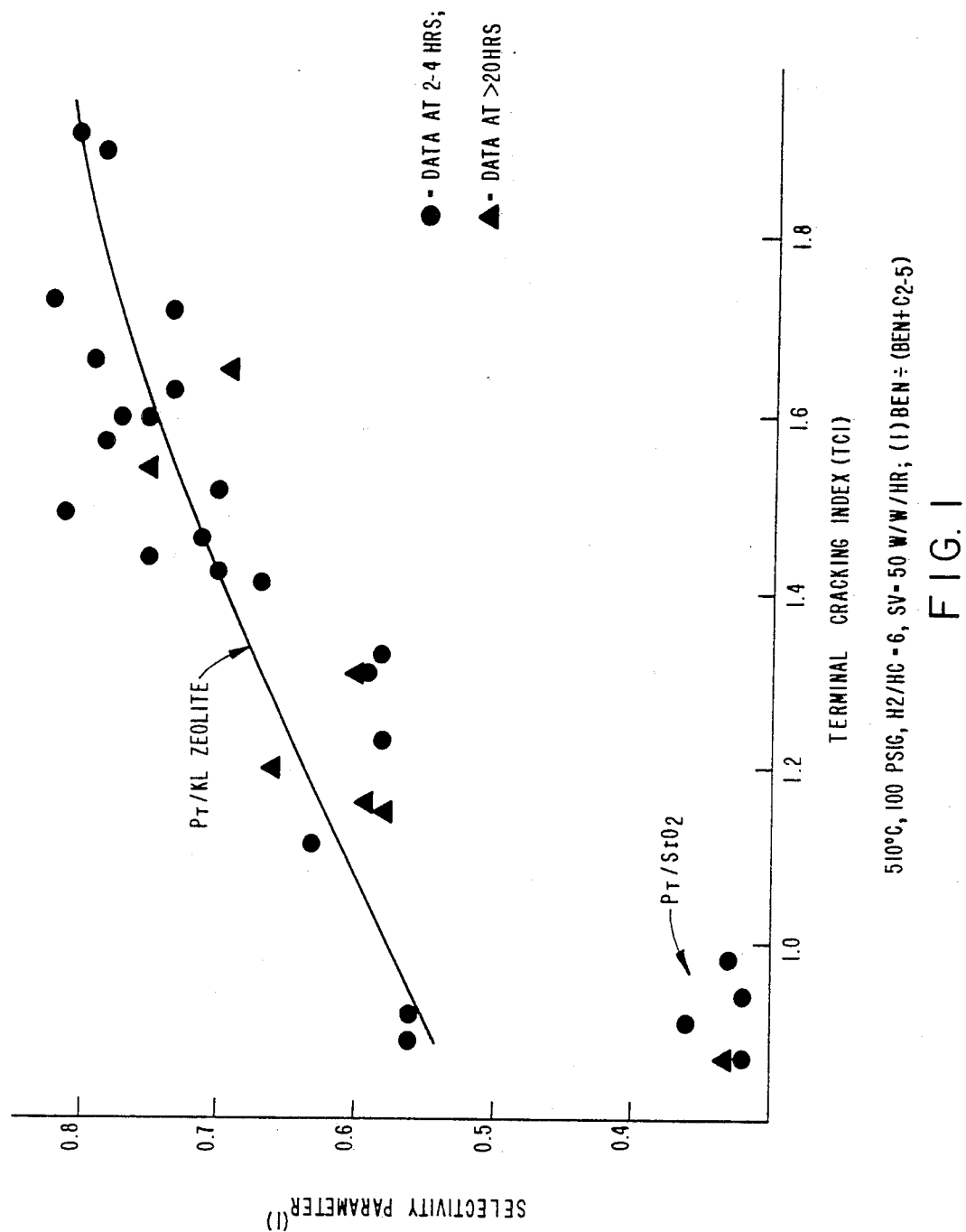
FIG. 1 represents a plot of the selectivity for benzene as measured by the selectivity parameter (weight ratio of benzene product to the sum of benzene plus C2 to C5 products) achieved, as a function of the terminal cracking index (TCI) defined hereinbelow, for platinum on type L zeolites and for platinum on silica after a time on oil of either about 3 or about 22 hours.

Type L zeolites are defined herein as synthetic zeolites which crystallize in the hexagonal system with a characteristic x-ray diffraction pattern obtained from CuK$_{60}$ radiation with the major d(A) peak values set out in Table A:

TABLE A

+16.1+0.3
+7.52+0.04
+6.00+0.04
+4.57+0.04
+4.35+0.04
+3.91+0.02
+3.47+0.02
+3.28+0.02
+3.17+0.01
+3.07+0.01
+2.91+0.01
+22.65+0.01
+2.46+0.01
+2.42+0.01
+2.19+0.01

Thus, they share a common zeolitic structure. For purposes of this invention, type L zeolites have a general formula as follows:

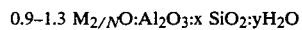

0.9–1.3 M$_{2/n}$O:Al$_2$O$_3$:x SiO$_2$:yH$_2$O where M designates at least one exchangeable cation, n represents the valence of M, y is any value from 0 to about 9, and x is disclosed in U.S. Pat. No. 3,216,789 to be 5.2 to 6.9, but may be outside this range provided the x-ray diffraction pattern of the zeolite is the same as that of zeolite L. A more complete description of zeolite L is provided in U.S. Pat. No. 3,216,789. Zeolite L has channel-shaped pores undulating from about 7 to 13 Å in diameter and may occur in the form of cylindrical crystals with a mean diameter of at least 0.5 micron and an aspect ratio of at least 0.5 (as described, e.g., in (U.K. Appln. 82-14747, the entire disclosure of which is incorporated herein by reference), as well as in other sizes and shapes.

The type L zeolites are conventionally prepared such that M in the above formula is potassium. See, e.g., U.S. Pat. Nos. 3,216,789 and 3,867,512. The potassium can be ion exchanged, as is well known, by treating the zeolite in an aqueous solution containing other cations. It is difficult, however, to exchange more than 75% of the original potassium cations, because some cations occupy sites in the zeolite structure which are nearly inaccessible. At least 75% of the exchangeable cations are selected from lithium, sodium, potassium, rubidium, cesium, calcium and barium. More preferably, the cation is sodium, potassium, rubidium or cesium, most preferably still, potassium, rubidium or cesium, most preferably potassium. Optionally, the exchangeable cations may consist of mixtures of the above-named Group IA cations or mixtures of a Group IA cation and barium or calcium cations. These mixtures of cations may be achieved, for example by treating the zeolite L with an aqueous solution containing a rubidium and/or cesium salt and then washing to remove excess ions.

This ion exchange treatment can be repeated to effect further ion exchange, although to a lesser degree.

The Group VIII noble metals which are necessary for catalytic activity are those metals from Group VIII of the Periodic Table of Elements which are selected from osmium, ruthenium, rhodium, iridium, palladium and platinum. Preferably, the metals which are employed herein are platinum, rhodium or iridium, and most preferably platinum. The metals may be present in any combination desired. Rhenium, a Group VIIB metal, may also be present so long as at least one Group VIII noble metal is present.

The amount of Group VIII noble metal present in the catalyst will be an effective amount and will depend, for example, on required catalyst activity, ease of uniform dispersion, and the crystal size of the type L zeolite. Crystal size limits the effective catalyst loading since highly loaded crystals of zeolite which have a large dimension parallel to the channels could easily lead to pore plugging during operation as the noble metal agglomerates inside the channels. Generally, however, the level of metal present will range from about 0.1 to 6%, preferably 0.1 to 3.5% and more preferably 0.1 to 2.5% by weight of the catalyst. Furthermore, the amount of metal present is generally from about 0.1 to 2.0% by weight of the catalyst if the average zeolite crystallite size parallel to the channels is greater than about 0.2 micron, and from about 1.0 to 6% by weight if the average zeolite crystallite size parallel to the channels is no greater than about 0.2 micron.

The Group VIII noble metals may be introduced into the zeolite by, for example, ion exchange, impregnation, carbonyl decomposition, adsorption from the gaseous phase, introduction during zeolite synthesis, and adsorption of metal vapor. The preferred technique is ion exchange. In some cases, e.g., when the metal(s) have been introduced by an ion-exchange process, it is preferred to remove the residual acidity of the zeolite by treating the catalyst, which has previously been reduced by hydrogen, with an aqueous solution of an alkaline base such as potassium carbonate. This treatment will neutralized any hydrogen ions formed during the reduction of Group VIII noble metal ions by hydrogen.

The preferred reforming catalyst of enhanced dispersion produced by the process of this invention is a unique composition characterized by several properties which lead to improved selectivity and activity maintenance over what is exhibited by other reforming catalysts outside the class defined herein under the same catalytic conditions. The greater the degree of dispersion of the metal within the channels, i.e., onto the internal surface area of the zeolite, the better will be the activity maintenance of the catalyst.

The activity of a catalyst is a measure of its ability to convert feed to products. While a catalyst may have a high activity, the products formed may not be necessarily the desired products. The term "selectivity" is a measure of the ability of the catalyst to convert feed to desired products. Activity maintenance concerns the ability of the catalyst to maintain a portion of its activity over time at conversion conditions, other variables remaining constant.

The decline in catalyst activity at conversion conditions is believed to be due primarily to crystal growth or agglomeration of the noble metal particles and secondarily to the formation of coke on the external and internal surfaces of the catalyst. At the same noble metal loading, catalysts containing particles or crystals of noble metals of a size greater than that disclosed above are less active and less selective than catalysts containing the smaller particles. Coke formation, probably due to complex condensation and dehydrogenation reactions, results in the shielding of the noble metal from the reaction mixture, thereby limiting the catalytic sites available for promoting reactions.

As catalytic activity declines by virtue of agglomeration and coke formation, the yield of desirable products will decline, and depending upon the economics of the operation a process employing the catalyst will have to be interrupted and catalyst activity restored to its initial value. Generally, catalytic activity can be maintained by increasing temperature, but there are limits beyond which the temperature cannot be increased, for example, temperatures which will change the nature of the zeolite or lead to undesirable side reactions.

Catalyst activity will decline over time as severity increases. Factors which affect severity include: the hydrogen to oil mole ratio, hydrogen partial pressure, total pressure, temperature, increasing feed rate per volume of catalyst (space velocity), and type of hydrocarbon in the feed.

In the measurement of activity maintenance all variables are fixed and only the catalyst differs. Thus, an activity of one catalyst over a period of time can be directly compared to the activity of another catalyst over the same time period where feed, hydrogen to oil ratios, pressures, etc., are constant.

Catalyst may be evaluated for their activity maintenance by two tests. In the Standard Activity Test (SAT) which is conventionally employed, the catalyst is sieved, mixed with sieved silica and charged into a reactor. The catalyst is then subjected to conditions of 510° C., 700 kPa (gauge), a space velocity of 2.5 w/w/hour and a $H_2$/hydrocarbon mole ratio of 6. The feed consists by weight of 60% n-hexane, 30% methylpentane and 10% methylcyclopentane (MCP). Catalysts are evaluated with respect to their cycle lengths, defined as the number of hours in which a time-averaged benzene yield of 50% by weight is maintained.

A second test of activity maintenance known as the Expedited Catalyst Aging Test (ECAT) has been developed where a total of 0.20 g of catalyst consisting of 20/40 mesh particles is mixed with 0.80 g of $SiO_2$ of 20/40 mesh. The resulting catalystc charge is introduced into a stainless steel downflow reactor of about 1 cm inner diameter equipped with a thermocouple. Before introduction of feed the catalyst is reduced in situ under flowing $H_2$ gas at temperatures no greater than 525° C. After reduction the feed is introduced into the reactor along with $H_2$ gas at a mole ratio of $H_2$:hydrocarbon of 6 and a space velocity of 50 w/w/hour, at a temperature of 510° C., and a pressure of 700 kPa (gauge). The products were analyzed using on-line gas chromatography, although other techniques are available and known in the industry. Catalysts are evaluated with respect to their benzene yield (weight percent) after 24 hours on feed.

The improvement in activity maintenance is manifested by the preferred catalysts produced by this invention in that they all provide a benzene yield in excess of 7 weight percent after 24 hours on oil in the ECAT test as described above using a feed comprising 20% by volume methylcyclopentane and 80% by volume N-hexane.

These preferred catalysts, at least prior to reduction thereof, consist of noble metal particles well dispersed over the surface of the catalyst. By the expression "well dispersed over the catalyst surface" is meant that the diameter of substantially all the particles in which the noble metal is dispersed is less than 7 Å as described hereinbelow. By "substantially all" is meant that at least 90%, and preferably greater than 98%, of the noble metal is dispersed in the form of smaller than 7 Å particles Initial dispersion of the catalyst is found to correlate directly with its activity maintenance when it is subjected to reforming conditions.

The surface of the catalyst over which the particles are dispersed necessarily includes the internal surface of the catalyst, i.e., the channels of the zeolite, but may also include dispersion over the external surface, which is considerably smaller. The dispersion will be present on those surfaces of the catalyst which are accessible to noble metal loading and dispersion techniques. The most preferred catalyst will contain highly dispersed noble metal atoms, all or substantially all of which are located inside the pores of the catalyst rather than on the exterior surface thereof. Thus, at least 75% and preferably, at least 90%, of the noble metal will exist inside the channels of the preferred catalyst herein. Further, the noble metal inside the channels must be well dispersed.

The property that the particles be well dispersed over the surface of the catalyst implies that there is no preferential disposition of noble metal particles on the external surface. In other words, it signifies that the noble metal is substantially uniformly distributed throughout the internal and external surfaces of the catalyst.

Additionally, the preferred catalyst produced by the process herein is characterized in that at least about 90% of the noble metal prior to reduction thereof is dispersed in the form of particles having a diameter less than about 7 Å. Thus, if, for example, more than 10% of the noble metal is dispersed in the form of particles measured to have diameters of 12-15 Å, or if more than 10% of the noble metal is dispersed in the form of particles measured to have diameters of greater than 15 Å, the catalyst exhibits reduced activity and activity maintenance. As measured by conventional bright field imaging in a transmission electron microscope with 4 Å point-to-point resolution, the particle size in the most preferred catalyst produced herein is found to be such that no greater than 2% of the noble metal is dispersed in the form of particles measured to be about 7 Å or greater in diameter.

The noble metal atoms may be clustered in any type of configuration, including that in which the atoms are connected to form a raft shape where they exist as a monatomic layer. The size of the particles as described above may be measured using high resolution electron microscopy. In this procedure, described in P. C. Flynn et al., *J., Catal.*, 33, 233-248 (1974), the noble metal loaded zeolite is prepared for the Transmission Electron Microscope (TEM) by crushing in an agate mortar and pestle to produce zeolite fragments through which an electron beam can pass. The crushed powder is ultrasonically dispersed in ethanol and a drop of this suspension is allowed to dry onto a standard 3 mm TEM grid, which is covered with a thin ($\leq 200$ Å) amorphous carbon film. Samples are analyzed in a Philips 400 T TEM at 100 KV by conventional bright field imaging. Owing to the complexities of the contrast and imaging process involved in the bright field imaging mode, the lowest measurable noble metal particle diameter is 7 Å when the particle is in raft shape, and is 5 Å when the particle is in spheroidal (agglomerated) shape. The actual size may differ by $\pm 2$ Å from these measurements. Therefore, noble metal particles less than 7 Å in diameter, typical of good dispersion, actually cannot be detected by the bright field imaging methed using the Philips 400T microscope. Thus, degree of dispersion is determined by measuring the quantity of noble metal dispersed in measurable particles of diameter 7 Å or greater. The remainder of the noble metal necessarily exists in the form of below 7 Å in diameter particles.

When different samples are compared under the electron microscope, there is a $\pm 50\%$ uncertainty in the relative thickness of the specimen. Consequently, the estimated percent amount of visible particulates (7 Å and greater if rafts, 5 Å and greater if spheroids) is subject to this same $+50\%$ uncertainty. For example, a catalyst reported comprising 10% noble metal particles measuring 7 Å diameter or greater, and 90% below 7 Å in diameter could actually consist of between 5% and 15% of visible particles measuring 7 Å and greater in diameter and between 95 and 85% of highly dispersed clusters below 7 Å in diameter.

As an additional characteristic, if the catalyst is Loaded with the noble metal by, for example, an ion-exchange technique, it is desirable that the type L zeolite chosen as a support have, prior to being loaded with the noble metal, a pH between and 11. 5 as detemined by the following method: A 2.5 g sample of zeolite is equilibrated at ambient temperature with 70 cc of distilled water and the pH of the slurry is determined. The pH should be higher than about 9.3, preferably 10 to 11. If the pH of the zeolite is not within the above range, we believe that traditional impregnation or ion exchange methods will not yield a catalyst which has highly dispersed noble metal particles within a preferred size range. While not limited to any one theory, the belief is that the pH of the zeolite characterizes a surface state of the zeolite and controls the affinity of the zeolite for the noble metal during ion exchange or impregnation.

Another feature of the preferred catalyst produced herein which identifies those catalysts having the improved activity maintenance as defined herein is its Terminal Cracking Index (TCI). This index is defined as the molar ratio of pentanes to butanes produced when the catalyst is evaluated by ECAT procedures described above using 100% n-hexane feed. The index measures the degree to which terminal cracking is promoted as opposed to internal cracking for a given catalyst. The higher this index the more selective the catalyst herein toward aromatization products because increased terminal cracking relative to internal carbon cracking of the hydrocarbon chain as measured by reforming n-hexane indicates that terminal adsorption of the substrate onto the noble metal occurs preferentially, as opposed to internal adsorption, thus favoring, for example, 1-6-closures for aromatization of hexane.

This index shows not only that to perform well the preferred catalyst herein must not be acidic, but also that the noble metal is not to any significant extent on the exterior surface of the catalyst, but rather is inside the channels of the catalyst and adsorbs the terminal carbon atom of straight-chain paraffins. For purposes herein, the terminal cracking index of the preferred type L zeolite catalysts produced by the process herein is greater than about 1.5, preferably greater than about 1.7.

FIG. 1 illustrates the relationship between the selectivity parameter (defined as the weight ratio of benzene product to the sum of total benzene plus $C_2$-$C_5$ produced) and the Terminal Cracking Index (TCI) for zeolite L loaded with 0.6% Pt. The relationship shows a clear correlation, indicating that the terminal cracking index does accurately identify the selective reforming catalysts when a type L zeolite is employed as the catalyst base. FIG. 1 also illustrates that a conventional active 0.6% Pt on silica catalyst has a much lower terminal cracking index which does not exceed 1.0. Such a value is typical of random cracking of a hexane molecule.

The TCI of a given catalyst varies with the type of feed and the severity of the conversion. Generally, as the result of secondary cracking reactions, the TCI for catalysts which have a TCI above one under ECAT conditions described above will decrease as the conversion is increased, as indicated in the following Table I. These results show that ECAT is a better test for determining the TCI of a catalyst than the SAT test because the TCI is not meaningful at the high conversion levels encountered under SAT test conditions.

TABLE I

| | | 0.6 wt. % Pt on Zeolite L Catalyst Loaded by Ion Exchange | | | | |
|---|---|---|---|---|---|---|
| | | | | After 1-3 Hrs. on Oil | | |
| Temp (°C.) | Pressure (kPA) | Space Velocity (w/w/hr.) | $H_2/C_6$ (mole:mole) | Benzene Yield (wt. %) | Conversion (wt. %) | TCI |
| 510 | 700 | 50 | 6.0 | 25.1 | 31.7 | 1.57[1] |
| 510 | 700 | 2.33 | 6.4 | 49.0 | 97.5 | 0.82[2] |

[1]This run was made using 100% n-hexane feed.
[2]This run was made using a feed of 60% n-hexane, 30% methylpentane and 10% methylcyclopentane. The latter two feed constituents are known to raise the TCI of the catalyst above what it would be using 100% n-hexane feed.

The TCI also varies with the type of catalyst employed, as indicated in Table II.

TABLE II

| Catalyst | wt. % Pt | Benzene Yield at 1-3 hours (wt. %) | TCI |
|---|---|---|---|
| Pt on NaX Zeolite | 1.0 | 30 | 0.9 |
| Pt on (Na/K)X Zeolites | 0.6 | 19.6 | 1.2-1.3 |
| Pt on K-treated $SiO_2$/$Al_2O_3$ | 0.73 | 4.1 | 0.8 |
| Pt on $SiO_2$ | 1.1 | 15.1 | 0.9 |
| Pt on $SiO_2$ | 0.74 | 10 | 0.9 |
| Pt on Potassium-Exchanged Zeolite L Catalyst of U.S. Pat. No. 4,104,320 | 0.6 | 21.1 | 1.3-1.4 |
| Pt on Potassium-Exchanged Zeolite L Catalyst Preferred for this Invention | 1.0 | 56.9 | 1.5-2.5 |

These results show that the catalyst of this invention which has a high TCI also has a high benzene yield. Experiments have shown, however, that the correlation between TCI and benzene yield cannot be made when the reforming catalyst is much less catalytically active than the catalysts listed in Table II above such as, e.g., platinum supported on KOH-treated (K-treated) silica/alumina.

We believe that catalysts based on type L zeolites which have the preferred noble metal particle size and dispersion as described above will necessarily have the terminal cracking index.

The preferred catalysts of this invention also exhibit substantial monofunctionality. Many known reforming catalysts exhibit bifunctionality in that not only do the noble metal atoms participate in the catalytic reaction, but also the acidic sites of the catalyst support. For example, a conventional catalyst consisting of Pt-Re metals on alumina aromatizes hexane through both the metal sites and the acid sites of the alumina support. In contrast, the catalyst herein behaves essentially monofunctionally in that the catalytic reactions predominantly occur on the noble metal sites of the catalyst, with only a small amount of catalysis occurring on the acidic sites initially produced when the catalyst is first reduced.

In the more specific embodiment of the invention described below the gaseous streams used in each step have a remaining percentage (which is not water, hydrogen, oxygen or a source of chlorine) of an inert gas such as helium, argon or nitrogen which will not interfere with the process. Preferably water is present in the gaseous stream of each step.

In this more preferred and detailed embodiment, in the first step the freshly prepared catalyst is contacted with a gaseous stream containing from 0 to 10% by volume water, preferably 0.5 to 5% by volume, more preferably 1-3%, based on the total stream volume, and oxygen (usually in the form of an oxygen-containing gas such as air), hydrogen or an inert gas, at a temperature of 380° to 540° C., depending on the catalyst employed. For purposes herein the inert gas is defined as a gas which does not react with the catalyst and is a carrier for the other gases used in other steps such as oxygen or hydrogen. Examples of suitable inert gases include helium, argon and nitrogen and mixtures thereof. The exact time for heating will depend on the temperature employed, but generally ranges up to 10 hours, preferably 2 to 8 hours. The amount of oxygen employed is generally from 0.1 to 25% by volume, preferably 0.2 to 15% by volume, more preferably from 0.5 to 12% of the gas stream. If hydrogen is employed the amount is 1 to 25% ty volume, preferably 2-20%. If an inert gas is employed it may constitute up to 100% by volume of the gaseous stream.

The second step of this specific method can proceed in one of four manners:

(i) The catalyst is oxychlorinated (dispersion of the noble metal) by heating at a temperature of from about 400° to 530° C., preferably 480°-520° C., for up to 10 hours, preferably 1 to 3 hours, in the presence of a gaseous stream comprising from 0 to 10% by volume water, preferably 0.5 to 5%, more preferably 1 to 3%, a source of chlorine such as, e.g., $Cl_2$, HCl, chloroform, methyl chloride, carbon tetrachloride, 1,2-dichloroethane, trichloroethane, or mixtures thereof, and the like, in an amount of about 0.005 to 10 volume percent, preferably 0.05 to 4%, more preferably 0.05 to 1%, and most preferably 0.05 to 0.5%, and in the presence of oxygen in an amount of 0.1 to 25% by volume, preferably 0.2 to 15%, more preferably 0.5 to 12%.

(ii) The catalyst is chlorinated by proceeding as in (i) except that hydrogen is used in place of oxygen. However, when HCl is the source of chlorine, hydrogen is not required. When proceeding in this manner, oxychlorination will occur in the third step discussed hereinbelow.

(iii) Steps (ii) and (i) can be combined in that order the preferred chlorine sources in this step are HCl and $Cl_2$.

(iv) The catalyst is chlorinated by heating at a temperature from about 400° to 530° C., preferably 480° to 520° C., for up to 10 hours preferably for 1 to 3 hours in the presence of a gaseous stream comprising from 0 to 10% by volume of water preferable 0.5 to 5% and more preferably to 3% and 0.005 to 10% chlorine more preferably 0.05 to 1% and most preferably 0.05 to 0.5%.

In the third step of this specific method (oxygen post-treat step), the catalyst is contacted with an oxygen-containing gaseous stream (where the amount of oxygen in the stream is generally 0.1 to 25% by volume, preferably 0.2 to 15%, more preferably 0.5 to 12%) at a temperature of 400° to 540° C. for up to 7 hours if essentially no water is employed or for up to 5 hours in the presence of greater than 0 to 10 volume percent water. Preferably, this step is carried out from 480° to 520° C. in the presence of 0.5 to 5% by volume water for to 0.5 hours and more preferably in the presence of 1 to 3 volume % water for 0.5 to 1.5 hours. If no water is present preferably the step is carried out for 0.5 to 6 hours, and more preferably for 1 to 5 hours.

In a fourth and final step (hydrogen reduction step) the catalyst is heated in the presence of a hydrogen-containing gaseous stream (where the amount of hydrogen in the stream is generally 1 to 25% by volume, preferably 2 to 20%) in the presence of from 0 to 10% by volume at a temperature of from about 400° to 530° C. for up to 10 hours. Preferably, this final step is carried out at a temperature of 400° to 520° C. in the presence of 0.5 to 5% by volume water for 1 to 6 hours.

In all steps, reactor pressure is generally from 0.1 to 2 MPa. Preferably the gas flow rates for each step the above process range from about 1 to 300 cc/g of catalyst per minute. If no oxychlorination step is employed, preferably the gas flow rate of the oxygen post-treat step is below 20 cc/g catalyst/min. and preferably below 10 cc/g catalyst/min. Optionally, the second step can consist of a chlorination step followed by an oxychlorination step as described hereinabove.

The catalysts of enhanced dispersion produced by the process of this invention may be employed as reforming catalysts using reforming conditions which are well known in the art.

To minimize any hydrocracking reactions which tend to prevail at the beginning of the reaction, it may be desirable to introduce a small amount (less than 0.1% by weight) of sulfur to the catalyst.

The following discussion is particularly directed to the preferred catalysts produced by the process herein which have the special properties defined above. Without being limited to any one theory, it is believed that the selectivity and activity of the catalyst are greatly influenced by the manner in which the reactant molecules are adsorbed at the active site of the catalyst. This theory is hereinafter called "molecular die" catalysis.

If the hexane is adsorbed terminally (through the $C_1$ atom), subsequent reaction preferably leads to aromatization. Another reaction occurring to a lesser extent is terminal cracking of adsorbed hexane. If initial adsorption is through a nonterminal carbon atom, no such aromatization can occur because end carbon activation is required for 1-6 ring closure. While terminal cracking also leads to methane production, the aromatization reaction occurs to a greater extent. The adsorption pattern may be influenced by the three-dimensional structure of the pores of the catalyst, which may columnate the reactant molecules. Furthermore, the interior structures of and spacial factors within the catalyst may affect favorably post-adsorption reactions as by, e.g., stabilizing or destabilizing the transition states so as to favor cyclization of adsorbed molecular species.

The channel structure of the zeolites gives rise to these molecular die effects, i.e., the zeolite one-dimensional channel structure orients the hexane molecules parallel to the axis of the channels. This orientation facilitates terminal adsorption onto the noble metal particles, leading to the observed increased activity and selectivity for aromatization.

The catalysts of enhanced dispersion produced by the process herein need not be used only in conventional reforming of naphthas derived from petroleum or other sources of hydrocarbons and boiling in the range of about 71° to 216° C. but may also be employed to produce the corresponding aromatic products from any reactant organic compound containing at least six carbon atoms, including those which contain reactant functional groups. Examples of reactant compounds suitable for this purpose include paraffins such as n-hexane, n-heptane, n-octane, n-nonane, etc., preferably naphtha boiling in the fraction between 71° and 216° C. Preferred reactions herein are aromatization of n-hexane to benzene, n-heptane to toluene, and n-octane to ethylbenzene and/or xylenes. n-Hexane may be present in the feed or produced by isomerization of methylpentanes and methylcyclopentane. Since the catalyst is monofunctional and does not promote isomerization without cyclization, feed compounds such as dimethyl butanes are not effective.

Additional reactions where the reforming catalyst produced by the process herein, especially the preferred class of catalysts produced herein, may be employed advantageously include benzene production from streams such as light naphtha, i.,e., a naphtha boiling between about 30° and 100° C., high octane gasoline production from naphtha or light virgin naphtha where the endpoint is between $C_7$ and $C_{12}$, inclusive.

The reforming processes described above are carried out under general reforming conditions in the presence of hydrogen at a moderate pressure to favor the aromatization reaction thermodynamically. For traditional reforming of paraffins to aromatics, the temperature depends on the particular paraffin, but for acceptable rate and selectivity preferably ranges from about 400° to 550° C., more preferably from about 450° to 520° C. at pressures of about 200 KPa to 5 MPa, more preferably about 500 KPa to 4 MPa. If the temperature is much below about 400° C. the yield of product is quite low, and if the temperature substantially exceeds about 550° C., other reactions occur which also diminish the yield product. The liquid hourly space velocity of this reforming reaction is preferably from about 0.5 to 20 w/w/hour, more preferably from 1 to 10 w/w/hour, and the $H_2$/reactant mole ratio is preferably from about 2 to 20, more preferably from about 4 to 10.

The dehydrocyclization reaction is generally carried out by injecting a feedstock charge in the presence of hydrogen gas into a reactor containing the catalyst.

The examples which follow illustrate the efficacy of the invention. In all examples, parts and percentages are given by weight for solids and liquids and by volume for gas compositions, and temperatures in degrees Centigrade unless otherwise noted.

EXAMPLE 1

(a) Zeolite L Synthesis

A zeolite L having a composition expressed in moles of pure oxide of 0.99 $K_2O:Al_2O_3:6.3\ SiO_2:xH_2O$ and having a cylindrical shape and an average particle size of dHdd 2 to 2.5 micron was prepared by the technique described in Example 1 of U.K. Patent Application 82-14147 filed May 14, 1982 to Wortel, entitled "Improved Zeolite L". Thus, an alkaline synthesis gel was prepared by dissolving 23.40 g of aluminum hydroxide by boiling in an aqueous solution of 51.23 g of potassium hydroxide pellets (85% pure KOH) in 100.2 g of water to form Solution A. After dissolution, any water loss was corrected. A separate solution, Solution B, was prepared by diluting 225 g of colloidal silica (Ludox HS 40) with 195.0 g of water.

Solutions A and B were mixed for two minutes to form a gel, and just before the gel became fully stiff, 224 g thereof was transferred to a Teflon-line autoclave, preheated to 150° C. and held at that temperature for 72 hours to bring about crystallization.

(b) Platinum Ion Exchange of Catalyst

The separated zeolite was slurried in water and $Pt(NH_3)_4Cl_2$ solution was added over about two-hour period. Following the addition of the Pt source stirring was continued overnight. The mixture was then filtered and the loaded potassium-exchanged zeolite L, containing 0.6% Pt by weight, was dried, tableted, crushed, screeneed to 20/40 mesh and calcined.

(c) Enhanced Dispersion of Catalyst by Multi-Step Technique

A total of 4.7 g of this freshly prepared catalyst A was contacted with a series of gas compositions as described below flowing at a rate of 200 cc/minute for the given period of time. The remaining percentage of the gas compositions consisted of He gas.

| Step | Temperature (°C.) | Composition (%) | Duration (hrs.) |
|---|---|---|---|
| Wet $H_2$ Treat | 510 | 20% $H_2$, 2% $H_2O$ | 2 |
| Wet HCl Treat | 510 | 0.25% HCl, 2% $H_2O$ | 1.3 |
| Wet Oxychlorination | 510 | 10.8% $O_2$, 0.25% HCl, 2% $H_2O$ | 2.8 |
| Wet $O_2$ Post-Treat | 510 | 11.5% $O_2$ 2% $H_2O$ | 1 |
| Wet $H_2$ Reduction | 510 | 20% $H_2$, 2% $H_2O$ | 1 |

The resulting catalyst B of enhanced dispersion and untreated catalyst A were evaluated for production of benzene using the ECAT procedure described above using a feed of 20% methylcyclopentane and 80% n-hexane. Catalyst A was calcined at 350° C. before testing in the reactor. The results are indicated below:

| | Benzene Yield (wt. %) Time on Oil (hours) | |
|---|---|---|
| Catalyst | 2 | 22-24 |
| Catalyst B | 26.2 | 14.5 |
| Catalyst A | 19.9 | 8.0 |

Figure 2A:
FIG. 2a represents an electron micrograph of a freshly prepared catalyst not treated by the multi-step technique of this invention which was calcined at 350° C., where the metric scale is indicated on the micrograph.
Figure 2B:
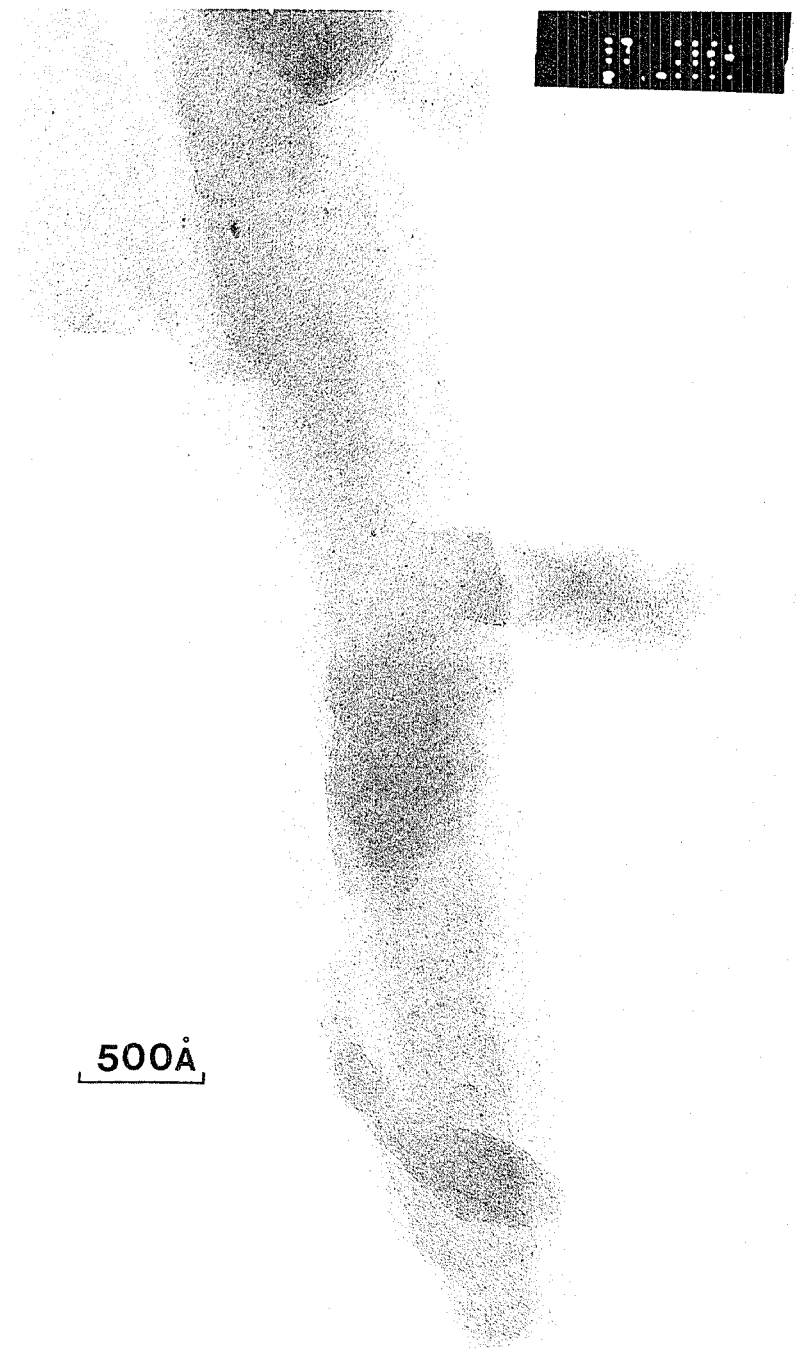
FIG. 2b represents an electron micrograph of the catalyst shown in FIG. 2a, except that a step of hydrogen reduction for one hour has been added, where the metric scale is indicated on the micrograph.
Figure 3:
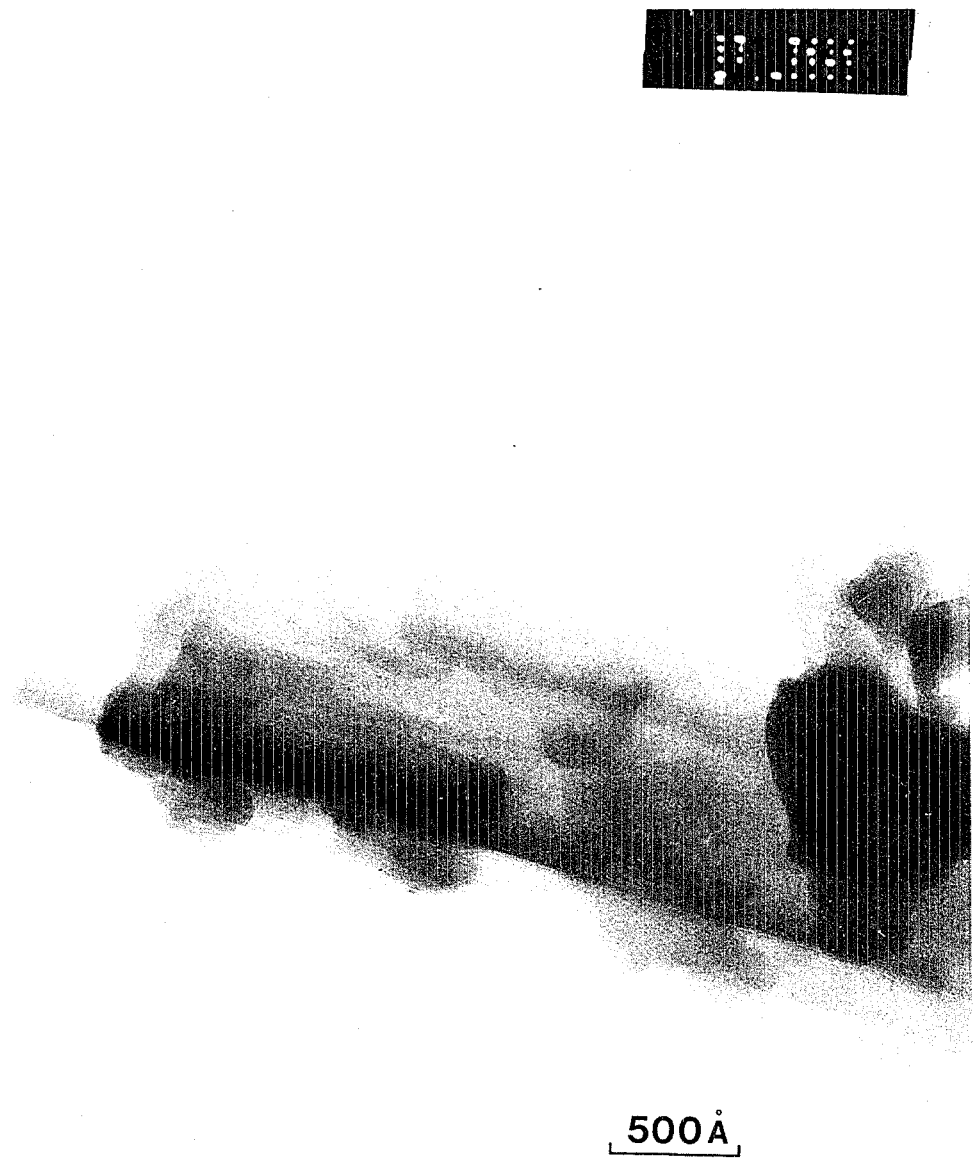
FIG. 3 represents an electron micrograph of the freshly prepared catalyst shown in FIG. 2a which was treated by the multi-step technique as described herein (with the preferred oxychlorination step), where the scale is indicated on the micrograph.

Electron micrographs of Catalyst A (after calcination at 350° C.) is presented in FIG. 2a, which shows 90% of the platinum to be present as particles below 7 Å and 10% measured to be 7 Å or larger. The micrograph of Catalyst A after calcination and hydrogen reduction at 510° C. for 1 hour is presented in FIG. 2b. Catalyst B is presented in FIG. 3. Catalyst A showed a platinum dispersion of 20% measured to be approximately 8 Å particles, with the remaining 80% less than 7 521. On the other hand, the activated Catalyst B measured less than 1% of the platinum to about >7 Å particles, with more than 99% less than 7 Å is below the detection limit. Further, a comparison of FIGS. 2a and 2b and the above dispersion measurements shows that reduction with $H_2$ leads to some agglomeration of the noble metal particles. As evidenced by the extremely high degree of dispersion of catalyst B which is in the reduced form after having been activated by the method of the present invention, no such agglomeration occurs with the catalyst of this invention.

This example also shows that the dispersed catalyst shows higher activity and activity maintenance than the freshly prepared catalyst.

EXAMPLE 2

A total of 4.2 g of catalyst, A was contacted as described in Example 1 with the following feed compositions:

| Step | Temperature (°C.) | Composition (%) | Duration (hrs.) |
|---|---|---|---|
| Wet $O_2$ Treat | 510 | 2.1% $O_2$, 2% $H_2O$ | 2.5 |
| Wet $O_2$ Treat | 510 | 9.3% $O_2$, 2% $H_2O$ | 1.5 |
| Wet Oxychlorination | 510 | 9.6% $O_2$, 0.15% $Cl_2$, 2% $H_2O$ | 2.5 |
| Wet $O_2$ Post-Treat | 510 | 9.7% $O_2$, 2% $H_2O$ | 1 |
| Wet $H_2$ Reduction | 510 | 20% $H_2$, 2% $H_2O$ | 1 |

The resulting catalyst C of enhanced dispersion had the following ECAT results as compared to catalyst A of Example 1 using a feed of 100% n-hexane:

| | Benzene Yield (wt. %) Time on Oil (hours) | | TCl at |
|---|---|---|---|
| Catalyst | 2 | 24 | 24 hrs. |
| Catalyst C | 17.3 | 22 | 2.04 |
| Catalyst A | 22 | 14.8 | 1.58 |

EXAMPLE 3

A total of 7.0 g of catalyst A was contacted as described in Example 1 with the following feed compositions (no water):

| Step | Temperature (°C.) | Composition (%) | Duration (hrs.) |
|---|---|---|---|
| Dry $O_2$ Treat | 480 | 1.9% $O_2$ | 2.5 |

-continued

| Step | Temperature (°C.) | Composition (%) | Duration (hrs.) |
|---|---|---|---|
| Dry $O_2$ Treat | 510 | 10% $O_2$, | 1 |
| Dry Oxychlorination | 510 | 10.9% $O_2$ 0.38% $Cl_2$ | 2.5 |
| Dry $O_2$ Post-Treat | 510 | 10.9% $O_2$ | 1 |
| Dry $H_2$ Reduction | 510 | 20% $H_2$ | 1.3 |

The resulting catalyst D of enhanced dispersion had the following ECAT results, as compared to the performance of catalyst A of Example 1, using a feed of 20% methylcyclopentane and 80% n-hexane:

| | Benzene Yield (wt. %) Time on Oil (hours) | |
|---|---|---|
| Catalyst | 2 | 22-24 |
| Catalyst D | 19.5 | 14.6 |
| Catalyst A | 19.9 | 8.0 |

The results show that both dry and wet methods may be employed and that both $C_2$ and HCl may be employed.

EXAMPLE 4

Another catalyst was prepared by contacting a total of 4.6 g of catalyst A as described in Example 1 with the following gas compositions, where all gas streams except the dry $O_2$ post-treat flowed at 200 cc/min. and the $O_2$ post-treat feed flowed at 50 cc/min.

| Step | Temperature (°C.) | Composition (%) | Duration (hrs.) |
|---|---|---|---|
| Wet $O_2$ Treat | 380 | 2.2% $O_2$ 2% $H_2O$ | 2.5 |
| Wet $O_2$ Treat | 510 | 9.3% $O_2$, 2% $H_2O$ | 1.5 |
| Wet HCl Treat | 510 | 0.2% HCl, 2% $H_2O$ | 1.3 |
| Dry $O_2$ Post-Treat | 510 | 10% $O_2$ | 1 |
| Dry $H_2$ Reduction | 510 | 20% $H_2$ | 1 |

The resulting catalyst E of enhanced dispersion had good ECAT results using a 100% n-hexane feed, as compared to the results of catalyst A of Example 1:

| | Benzene Yield (wt. %) Time on Oil (hours) | | TCI at |
|---|---|---|---|
| Catalyst | 2 | 22-24 | 24 hrs. |
| Catalyst E | 41.5 | 19.4 | 1.60 |
| Catalyst A | 22 | 14.8 | 1.58 |

EXAMPLE 5

A total of 16 g of the freshly prepared catalyst A of Example 1 was contacted as in Example 1 with a series of the following gas compositions flowing at a rate of 200 cc/min. for the given period of time. (The remaining percentage of the gas compositions is He gas.)

| Step | Temperature (°C.) | Composition (%) | Duration (hrs.) |
|---|---|---|---|
| Wet $O_2$ Treat | 480 | 2.2% $O_2$ 2% $H_2O$ | 2.5 |
| Wet $O_2$ Treat | 510 | 10.9% $O_2$, 2% $H_2O$ | 1.5 |
| Wet Oxychlorination | 510 | 0.25% HCl, 10.4% $O_2$ | 2.5 |

-continued

| Step | Temperature (°C.) | Composition (%) | Duration (hrs.) |
|---|---|---|---|
| Wet $O_2$ Post-Treat | 510 | 2% $H_2O$ 20% $H_2$ 2% $H_2O$ | 1 |
| Wet $H_2$ Reduction | 510 | 20% $H_2$ 2% $H_2O$ | 1.8 |

The resulting catalyst F of enhanced dispersion was compared with catalyst A for production of benzene using the ECAT procedure described above and a feed of 20% methylcyclopentane and 80% n-hexane. The results are indicated below:

| | Benzene Yield (wt. %) Time on Oil (hours) | |
|---|---|---|
| Catalyst | 2 | 24 |
| Catalyst F | 37.8 | 9.6 |
| Catalyst A | 19.9 | 8.0 |

All of the above examples show that the multi-step method described herein improves catalyst activity and activity maintenance. Further, Example 1 shows that the multi-step method also improves the dispersion of the platinum.

EXAMPLE 6

A fresh catalyst G consisting of 0.6% Pt on zeolite L was prepared as described in steps (a) and (b) of Example 1 except that heating to crystallize was carried out by rapid heating to 100° C., holding at 100° C. for 24 hours and rapid heating to 200 ° C., the pH of ion exchange was not controlled, and calcining was carried out at a higher temperature than calcining of catalyst A. This catalyst exhibited poor activity and activity maintenance. Its calcined but unreduced form, as determined by the electron micrograph of FIG. 4, contained large Pt agglomerates. This catalyst was subjected to the multi-step procedure (c) of Example 1 as described below at 510° C. and a gas flow rate of 200 cc/min. for each step:

| Step | Gas Composition | Duration (hrs.) |
|---|---|---|
| Wet $H_2$ Reduction | 20% $H_2$, 2% $H_2O$ | 2 |
| Wet HCl Treat | 0.18% HCl, 2% $H_2O$ | 0.5 |
| Wet Oxychlorination | 0.18% HCl, 10.6% $O_2$, 2% $H_2O$ | 2.8 |
| Wet $O_2$ Post-Treat | 10.6% $O_2$, 2% $H_2O$ | 1 |
| Wet $H_2$ Reduction | 20% $H_2$, 2% $H_2O$ | 1 |

Listed below are the results using the ECAT procedure described in Example 5 on the resulting catalyst H of enhanced dispersion as compared with the non-dispersed catalyst G.

| | Benzene Yield (wt?. %) Time on Oil (hours) | |
|---|---|---|
| Catalyst | 2 | 24 |
| Catalyst H | 6.5 | 4.8 |
| Catalyst G | 2.7 | — |

Figure 4:
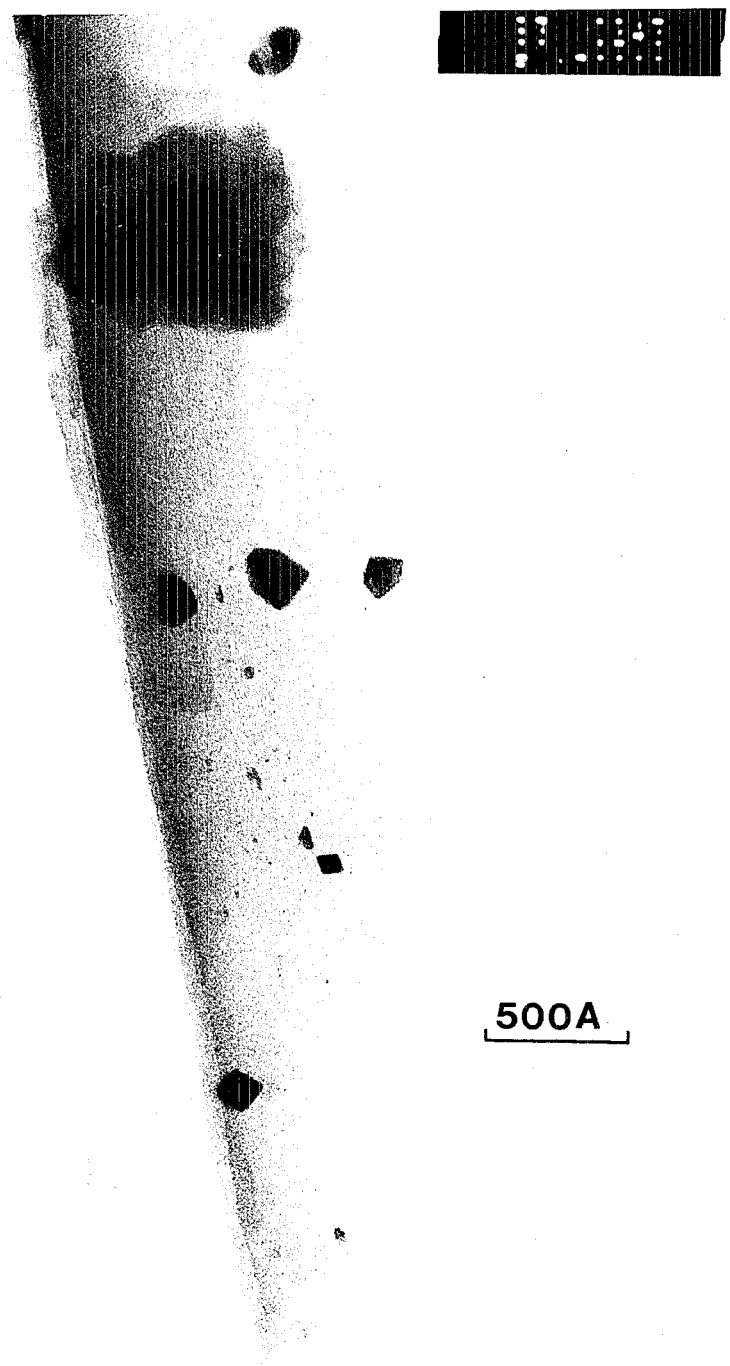
FIG. 4 represents an electron micrograph of another, less active, freshly prepared catalyst not treated by the multi-step technique of this invention which was calcined but not reduced in hydrogen, where the scale is indicated on the micrograph.
Figure 5:
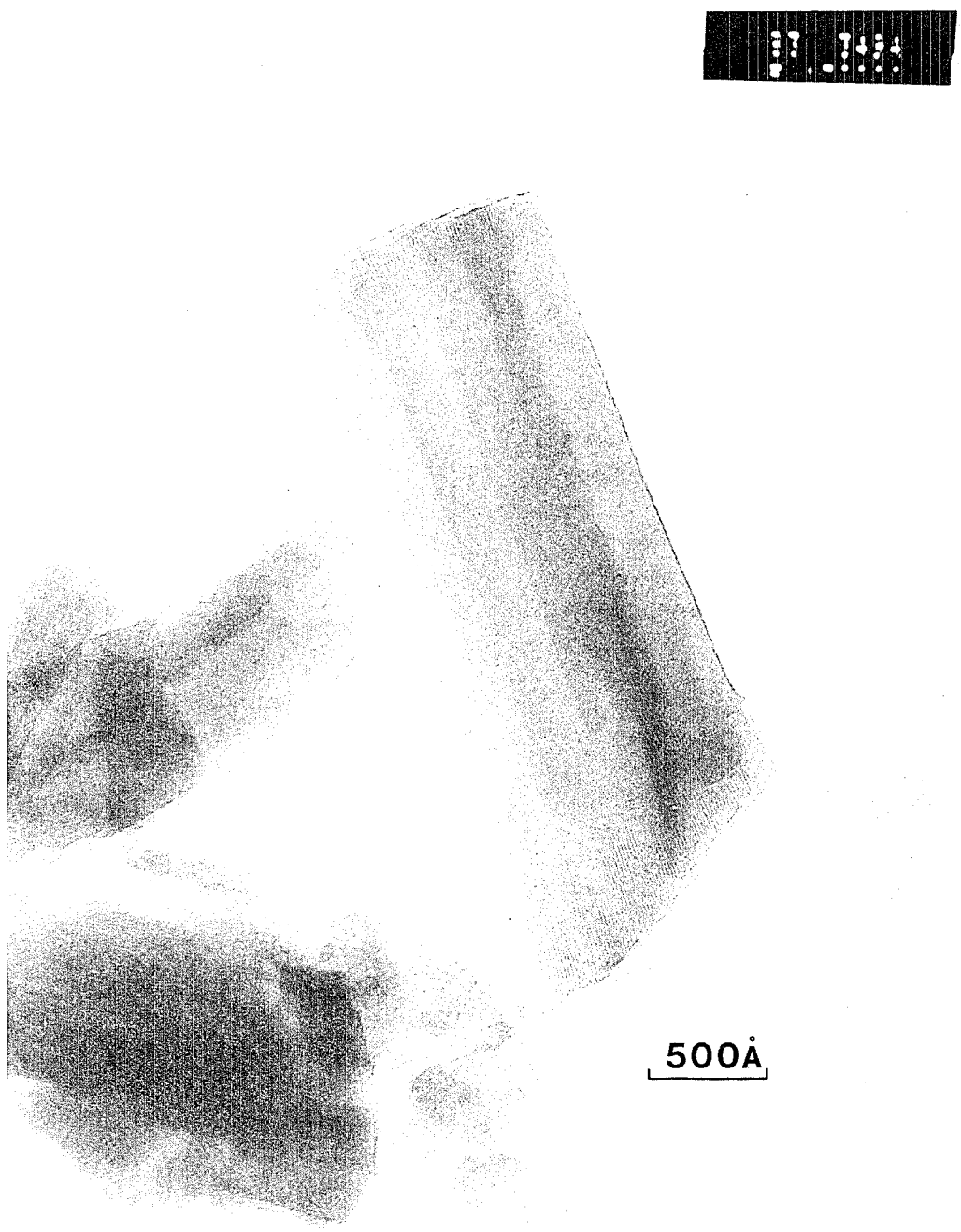
FIG. 5 represents an electron micrograph of the freshly prepared catalyst shown in FIG. 4 which was treated by the multi-step technique as described herein, where the scale is indicated on the micrograph.

The results show that the enhanced dispersion procedure herein improves the activity and activity maintenance of the low activity catalyst G, although not necessarily to the level of a fresh catalyst such as catalyst A of Example 1, which has good activity before enhanced dispersion. FIG. 5, depicting the electron micrograph of catalyst H, shows that the Pt was far more dispersed than in the fresh catalyst G prior to the multi-step treatment. Thus, FIG. 5 showed that, in catalyst H, 85% of the Pt was dispersed in the form of particles naving a diameter less than about 7 Å and 15% measured to be 7 Å or greater. In contrast, FIG. 4, showing the electron micrograph of catalyst G, indicated that 70% of the Pt was dispersed in the form of agglomerates having diameter measured to be 100 Å or larger, 5% measured to be 10 Å and only 25% had a diameter less than about 7 Å.

In summary, the present invention is seen to provide a method for preparing reforming catalysts of enhanced dispersion, preferably potassium-exchanged zeolite L containing platinum, which exhibit improved catalyst activity and activity maintenance.

What is claimed is:

1. A process for preparing an improved type L zeolite reforming catalyst containing at least one Group VIII noble metal which comprises:
   (a) improving the dispersion of the at least one noble metal by oxychlorination;
   (b) removing excess chlorine from the catalyst and stabilizing the dispersion of the at least one noble metal in the catalyst; and
   (c) reducing the dispersed at least one noble metal.

2. The process of claim 1 herein the chlorine source in the oxychlorination in step a is HCl or $Cl_2$ and steps (a) and (b) are carried out in the presence of water.

3. The process of claim 1 wherein the catalyst is contacted in step (b) with a gas stream comprising a mixture of steam and oxygen.

4. A process for preparing an improved reforming catalyst which comprises:
   (a) heating a freshly prepared reforming catalyst comprising a type L zeolite containing at least one Group VIII noble metal at a temperature from about 380 to 540° C. in the presence of an atmosphere comprising oxygen, or an inert gas and from 0 to 10% by volume water;
   (b) subjecting the catalyst to a temperature from about 400° to 530° C., in the presence of a gaseous stream comprising from 0 to 10% by volume water and a source of chlorine;
   (c) subjecting the catalyst to a temperature from about 400° to 540° C. for a period of time less than that required to substantially agglomerate the noble metal in the presence of a gaseous stream comprising oxygen.

5. The process of claim 4 wherein the source of chlorine in step (b) is HCl.

6. The process of claim 4 wherein the source of chlorine in step (b) is $Cl_2$.

7. The process of claim 4 wherein the source of chlorine in step (b) is a chlorinated hydrocarbon and the gaseous stream also contained an effective amount of hydrogen or oxygen.

8. The process of claim 4 wherein step (b) comprises (i) treating the catalyst in the presence of hydrogen, and with a gaseous stream comprising chlorine, HCl, and a chlorinated hydrocarbon and (ii) thereafter treating the catalyst, in the presence of oxygen with a gaseous stream comprising chlorine, HCl and a chlorinated hydrocarbon.

9. The process of claim 8 wherein step (b) comprises (i) treating the catalyst, in the presence of hydrogen, with a gaseous stream comprising chlorine and HCl and (ii) thereafter treating the catalyst, in the presence of oxygen, with a gaseous stream comprising chlorine and HCl.

10. The process of claim 4 wherein subsequent to step (c) the catalyst is reduced in a gaseous stream comprising hydrogen and about 0.5 to 5.0% by volume water.

11. The process of claim 4 wherein the type L zeolite has exchangeable cations of which at least 75 percent are selected from the group consisting of lithium, sodium, potassium, rubidium, cesium, calcium and barium cations.

12. The process of claim 11 wherein the product of step (c) after reduction is characterized in that the particles of the at least one noble metal are well dispersed over the surface of the catalyst and at least about 90% of the noble metal is dispersed in the form of particles having a diameter of less than about 7 Å as measured by bright field imaging on a scanning transmission electron micorscope with 4 Å point-to-point resolution.

13. The process of claim 6 wherein the exchangeable cation is potassium.

14. The process of claim 13 wherein the noble metal is platinum.

15. The process of claim 4 wherein the product of step (c) after reduction has a terminal cracking index of greater than about 1.5.

16. The process of claim 4 wherein the product of step (c) after reduction has a catalyst activity maintenance to provide a benzene yield greater than 7 weight percent after 24 hours using a feed comprising 20% by volume methylcyclopentane and 80% by volume n-nexane under ECAT conditions.

17. A process for preparing an improved type L zeolite reforming catalyst containing at least one Group VIII noble metal which comprises:
   (a) subjecting the catalyst to a temperature from about 380° to 540° and hydrogen;
   (b) subjecting the catalyst to a temperature from 450° to 530° C. in the presence of about 0.5 to 5.0% by volume water and about 0.05 to 1.0% by volume HCl.
   (c) subjecting the catalyst to a temperature from 480° to 520° C. in the presence of a gaseous stream comprising about 0.05 to 1.0% by volume HCl or about 0.5 to 1.0% by volume chlorine and oxygen;
   (d) subjecting the catalyst to a temperature from 480° to 520° C., in the presence of oxygen;
   (e) and thereafter reducing the catalyst in the presence of hydrogen;
   and in which steps (a) through (e) are conducted in the presence of about 0.5 to 5.0% by volume water.

18. The process of claim 17 wherein the product of step (e) after reduction is characterized in that the particles of the at least one noble metal are well dispersed over the surface of the catalyst and at least about 90% of the at least one noble metal is dispersed on the form of particles having a diameter of less than about 7 Å as measured by bright field imaging on a scanning transmission electron microscope with a 4 Å point-to-point resolution.

19. The process of claim 18 wherein at least about 98% of the at least one noble metal is dispersed in the form of particles having a diameter of less than about 7 Å as measured by bright field imaging on a scanning transmission electron microscope with 4 Å point-to-point resolution.

20. A catalyst comprising a type L zeolite containing at least one Group VIII noble metal, characterized in that the particles of the at least one noble metal are well dispersed over the surface of the catalyst and at least 90% of the noble metal after reduction is dispersed in the form of particles having a diameter of less than about 7 Å as measured by bright field imaging on a scanning transmission electron microscope with 4 Å point-to-point resolution.

21. The catalyst of claim 20 wherein the zeolite comprises exchangeable cations of which 75% are selected from the group consisting of lithium, sodium, potassium, rubidium, cesium, calcium and barium cations.

22. The catalyst of claim 21 wherein the noble metal is selected from the group consisting of platinum, rhodium, and iridium.

23. A reforming catalyst comprising zeolite L and containing at least one noble metal selected from the group consisting of platinum, rhodium and iridium, exchangeable cations of which 75% are potassium, the particles of the noble metal are well dispersed over the surface of the catalyst and at least 90% of the noble metal after reduction is dispersed in the form of particles having a diameter less than 7 Å as measured by bright field imaging on a scanning transmission electron microscope with 4 Å point-to-point resolution.

24. The catalyst of claim 23 wherein the noble metal is platinum.

25. The catalyst of claim 24 wherein at least about 98% of the noble metal after reduction is disposed in the form of particles having a diameter of less than about 7 Å as measured by bright field imaging on a scanning transmission electron microscope with 4 Å point-to-point resolution.

26. The catalyst of claim 25 wherein the average size of the crystals of the zeolite is no greater than about 0.2 microns and the noble metal is present in an amount from about 1.0 to 6% by weight of catalyst.

27. The catalyst of claim 25 wherein the average size of the crystals of the zeolite is greater than about 0.2 microns and the noble, metal is present in an amount of from about 0.1 to 2.0% by weight of the catalyst.

* * * * *